Dec. 28, 1954   U. B. YEAGER   2,698,102
UNLOADING VIBRATOR FOR TRANSPORT MEANS
Filed Oct. 1, 1951

INVENTOR.
ULYSSES B. YEAGER
BY
DES JARDINS ROBINSON & KEISER
HIS ATTORNEYS

United States Patent Office 2,698,102
Patented Dec. 28, 1954

2,698,102

UNLOADING VIBRATOR FOR TRANSPORT MEANS

Ulysses B. Yeager, Huntington, W. Va.

Application October 1, 1951, Serial No. 249,062

12 Claims. (Cl. 214—64.2)

This invention relates to unloading vibrators for transport means, and it more particularly pertains to vibrators for unloadnig transport vehicles, such as railway hopper cars.

Vibrator devices for discharging flowable solid materials are either of a type built into the discharging structure or disposed to be moved into contact therewith, and the present invention is of this latter type. However, it is one which is simple in construction, and can be readily moved into contact with the side wall of the transport vehicle for use, and then be as readily moved out of contact therewith and out of the way after being used.

Accordingly, one of the principal objects of my invention is an unloading vibrator which is simple in construction and efficient in operation.

Another object of the invention is an unloading vibrator which is so mounted as to be normally held out of the way in an inoperative position but can be easily moved into operative position.

Another object of the invention is an unloading vibrator which is easily adjusted to any desired height and for snugly engaging the exterior side of one of the opposite side walls of a transport vehicle.

Still another object of the invention is an unloading vibrator which is provided with means for being yieldably held against the side wall of the transport vehicle.

Further objects, and objects relating to details of construction and economies of operation, will readily appear from the detailed description to follow. In one instance, I have accomplished the objects of my invention by the device and means set forth in the following specification. My invention is clearly defined and pointed out in the appended claims A structure constituting a preferred embodiment of my invention is illustrated in the accompanying drawing, forming a part of this specification, in which:

Figures 1, 2, 3:
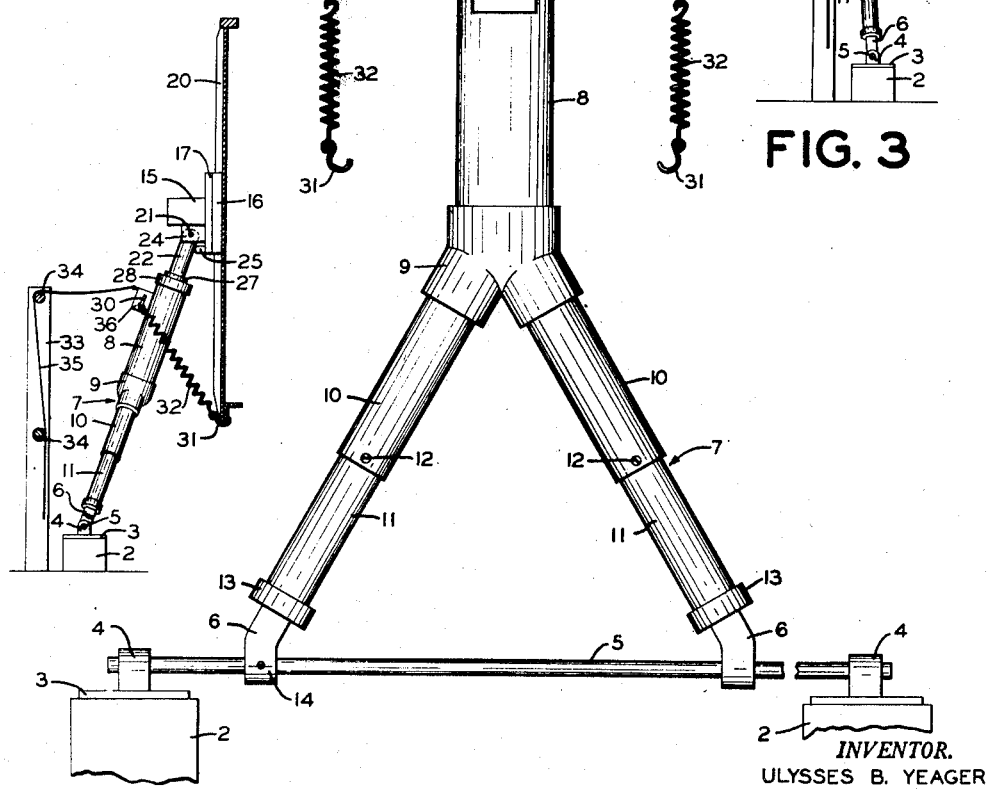
Fig. 1 is an elevation view of an unloading vibrator embodying my invention.
Fig. 2 is a side view of the unloading vibrator in operative position against one side wall of the transport vehicle.
Fig. 3 is a side view of the unloading vibrator moved to inoperative position against its backstop.

The invention generally described comprises a vibrator pivotally mounted upon the top end of a support or standard that is pivotally mounted upon a pedestal or pedestals for being swung to and from a back support in and out of engagement against the exterior side wall of a transport vehicle. The unloading vibrator is particularly adapted for unloading railway hopper cars and is disposed adjacent the trackway in position to be moved in and out of engagement with any of the hopper cars as they are moved along the trackway to the unloading station. It is to be understood that several such unloading vibrators may be disposed along one or both sides of the trackway at desired intervals so that any one or all of them can be used as desired. Since it is about as easy to move the car in front of the vibrator as to move the vibrator, the device may be mounted with only limited longitudinal movement on the pivot provided. The support or standard is adjustable in length so that the vibrator on the top end thereof may be adjusted to any selected elevation. The vibrator is also pivotally mounted on the support or standard and adapted to be properly adjusted for the vibrator to be snugly brought into contact with a portion of the side wall of the transport car. Means are also carried by the vibrator, preferably by the standard or support, for yieldably holding said vibrator against the side of the car.

Referring specifically to the drawings in which like numbers are used to designate like parts, numeral 2 is a pair of concrete foundation pedestals, each having secured to its top side, by any suitable means, a plate shoe 3 with a lug 4 recessed to receive a pin 5 for pivoting the feet 6 of a support or standard 7 thereto, said feet also being recessed to receive the rod 5.

The support or standard 7 comprises an intermediate body 8 having a pair of legs fitted to its bottom end by a yoke 9, each of said legs comprising tubular sections 10 and 11 telescoping together. The outer section 10 carries a set screw 12 projecting therethrough for its inner end to be clamped against the wall of inner section 11. The legs by reason of the telescopic tubular sections can thus be extended or contracted to adjust their length, thereby adjusting the length or elevation of the support or standard. A foot 6 is fixed to the bottom end of each of the legs by any suitable means such as by the bottom end of leg section 11 fitting within a socket surrounded by a flange 13 and welded thereto. While one foot might be satisfactory, two of them are preferable. Since the feet are movable longitudinally on rod 5, they are preferably provided with set screw 14.

A vibrator 15 comprises two cheek plates 16 sufficiently spaced apart on the face of a bridge plate 17 to provide an intervening recess 18 for receiving one of the vertical ribs on the side wall on a conventional drop bottom railway hopper car 20. The vibrator, of any construction, is fixed to the back of the bridge plate 17 and is pivoted at 21 to a neck portion 22 of the standard or support between spaced apart lugs 24 carried by the vibrator. There is stop 25 fitted to the back of the bridge plate 17 disposed to abut against the neck 22 for holding the cheek plates parallel with the side wall of the car for assuring close contact of the cheek plates throughout their entire areas. This may be adjustable as to length by being screw threaded to the plate. The neck portion 22 is fitted to the body by a collar 27 having a flange 28 surrounding a seating socket into which the end of the body is secured. A set screw 29 is threaded to the hub of the collar for clamping the neck portion projecting therethrough. The bridge plate can be tilted back, when the vibrator is not in use, on pivot 21 to bring the cheeks and bridge plate uppermost and over the vibrator 15 to protect it against the weather. The vibrator in this position will abut against the neck and be held in place.

A cross-arm 30 is mounted on the body portion 8 and provided with hand hooks 31 for engaging the bottom corner edges of the hopper car The hooks are connected to the opposite ends of the cross-arm by means of spring 32 for yieldably holding the cheeks of the vibrator plates against the side wall of the car.

When the vibrator is not in its operative position as shown in Fig. 2, it can be pivoted back against the bar 34 that is mounted on a pair of posts 33 (one shown). In order to facilitate moving the vibrator to and from its extreme positions, a pull cord 35 is threaded over the bar 34, one end of said cord being attached to the vibrator or the standard to which the vibrator is connected and the other accessible to the operator. A block 36 is fixed to the back of the body in position to abut against bar 34. If desired a lower cross bar 34 can be provided.

When the vibrator is moved back to inoperative position as shown in Fig. 3, it is preferably past dead center in order to lean against the stop by gravity without any positive means for holding it there. However, it will be understood that some means, such as a latch, may be used, if desired, for holding the vibrator in its inoperative position against the back rest.

The rod 5 for pivotally connecting the support to the foundation is not only a pivot but is also a rail support along which the device is moved to position the vibrator selectively alongside of any one of a number of cars to be unloaded. This mounting typifies any suitable connection for pivotal and longitudinal adjustment. It will also be understood that the rod rail could be elevated sufficiently high from the ground for the support carrying the vibrator to be suspended therefrom to be swung against the side of the car.

While the structure provides for sufficient longitudinal adjustment for the vibrator to be moved in position alongside of any one or several cars on the track, it probably would be easier to move the cars in position in front of the vibrator than to move the vibrator.

From the foregoing description the operation of the device is believed to be obvious. Normally the vibrator is swung back to its inoperative position against the back rest as shown in Fig. 3, but when used, it is swung out adjacent the side wall of the car with the vibrator cheek plates adjusted parallel to the side wall of the car so that they will be in close contact therewith. The hooks of the cross-arm are hooked over the bottom edge of the car to yieldably hold the vibrator in snug contact with the side wall of the car. After the car has been emptied of its load, the hooks 31 on the opposite ends of the cross-arm are disengaged from the bottom edge of the car and the vibrator swung back from operative position to its inoperative position against the back rest. Since the cheek plates 16 of the vibrator are yieldably held against the side wall of the car by the springs 32, the combined operation of the vibrator and springs will cause the plates to move out of contact with the side wall of the car and to reengage therewith in phase with the vibrations produced by the vibrator. This causes a tapping action against the side wall of the car in addition to the vibration. Accordingly, more effective agitation is obtained with less power supplied to the vibrator. The frequency of the vibrator is substantially the same as the frequency of the intervals of separation of the plates relative to the transport vehicle.

I am aware that there may be various changes made in details of construction without departing from the spirit of my invention, and, therefore, I claim my invention broadly as indicated by the appended claims.

Having thus described my invention, what I claim as new and useful, and desire to secure by United States Letters Patent, is:

1. As an article of manufacture, an unloading vibrator for transport means comprising an upright support having its bottom end movably mounted upon a foundation to be placed in position for being moved toward and away from a transport means, a vibrator mounted on the support in position to be contacted with said transport means, spring means carried by said support and means carried by the spring means for engaging said transport means to hold said vibrator in yieldable contact therewith.

2. The unloading vibration device of claim 1 in which the spring means is carried by an arm fixed to the support.

3. The unloading vibration device of claim 2 in which the arm extends from one side of the support and the spring means is mounted on the extended end of said arm.

4. The unloading vibration device of claim 3 in which the arm is a cross-arm extending from opposite sides of the upright support and there is a spring means on each of the opposite ends of the arm.

5. As an article of manufacture, an unloading vibrator device for transport means comprising a support adapted to be pivoted at one end to a pedestal, a vibrator mounted on the opposite end of said support adapted to be moved in and out of contact with the side of the transport means, and spring means carried by the device having connecting means for yieldably holding said vibrator against the side wall of said transport vehicle.

6. The unloading device of claim 5 in which the support is composed of sections adjustably connected together.

7. The unloading device of claim 5 in which the support is composed of extensible sections adjustably connected together.

8. The unloading device of claim 7 in which the mounting for the vibrator is adjustable and comprises a pivotal connection between said vibrator and the support and an adjustable stop means for adjusting the vibrator in respect to the support.

9. As an article of manufacture, an unloading vibrator device for transport means comprising a body portion and a support having a plurality of feet at one end of the body portion adapted to be pivotally mounted to a pedestal, a head portion for the body portion on which a vibrator is pivotally mounted, and an arm carried by the body portion and provided with a spring adapted to be secured to the transport means.

10. The unloading vibration device of claim 9 in which the vibrator comprises a pair of plates mounted in spaced apart relation upon a connecting bridge.

11. The unloading vibration device of claim 10 in which the feet comprises extensible sections adjustably connected together.

12. The unloading device of claim 9 comprising a plurality of spring arms.

References Cited in the file of this patent

UNITED STATES PATENTS

| Number | Name | Date |
|---|---|---|
| 1,583,647 | Bayles | May 4, 1926 |
| 1,693,395 | Lawton | Nov. 27, 1928 |
| 1,855,474 | Crawford | Apr. 26, 1932 |
| 1,858,855 | Haas | May 17, 1932 |
| 2,185,850 | Jackson | Jan. 2, 1940 |
| 2,332,687 | Baily | Oct. 26, 1943 |
| 2,431,872 | Kavula | Dec. 2, 1947 |
| 2,507,749 | Bacheldor | May 16, 1950 |
| 2,621,813 | Bauerle et al. | Dec. 16, 1952 |
| 2,673,651 | Plant | Mar. 30, 1954 |

FOREIGN PATENTS

| Number | Country | Date |
|---|---|---|
| 617,913 | France | Feb. 28, 1927 |